US006983425B2

(12) United States Patent
Lin-Hendel (10) Patent No.: US 6,983,425 B2
(45) Date of Patent: Jan. 3, 2006

(54) SHORT-CUT ICON VAULT (76) Inventor: Catherine Lin-Hendel, 18850 Blythswood Dr., Los Gatos, CA (US) 95030

( * ) Notice: Subject to any disclaimer, the term of this patent is extended or adjusted under 35 U.S.C. 154(b) by 339 days.

(21) Appl. No.: 10/109,765

(22) Filed: Mar. 30, 2002

(65) Prior Publication Data
US 2003/0184600 A1 Oct. 2, 2003

Related U.S. Application Data

(60) Provisional application No. 60/262,971, filed on Mar. 30, 2001.

(51) Int. Cl.
*G06F 3/14* (2006.01)
(52) U.S. Cl. .................. 715/853; 715/854; 715/847; 715/809
(58) Field of Classification Search ................ 715/775, 715/847, 853, 854, 837, 809
See application file for complete search history.

(56) References Cited

U.S. PATENT DOCUMENTS 5,583,984 A * 12/1996 Conrad et al. .......... 715/835 X
5,751,287 A * 5/1998 Hahn et al. .................. 345/775
6,023,506 A * 2/2000 Ote et al. .................... 713/165
2002/0091697 A1 * 7/2002 Huang et al. ................. 707/10

OTHER PUBLICATIONS

Alan Simpson, Windows 95 Uncut, copyright 1995, IDG Books Worldwide Inc, pp.:19; 66; 161.*

* cited by examiner

*Primary Examiner*—Raymond J. Bayerl (57) ABSTRACT

A system and method for organizing short-cut icons on an electronic display device utilizing a virtual filing cabinet for storing the icons to reduce clutter and confusion on large electronic device screens, and enable organized storage of the icons to be accessed at will for smaller device display screens. At the time of creation, and at any later time, every icon can be deposited into the virtual filing cabinet with a user defined directory structure or the icon can be left displayed on the display device. A data field allows device user or the program-installer to enter a brief notation regarding the nature, functionality, and the name of the program, file, or data represented by the short-cut icon. An icon displayed on the display device screen can be deposited into virtual filing cabinet at any later time, at will, and can be called forth onto the display screen, at any later time, at will.

17 Claims, 7 Drawing Sheets

SHORT-CUT ICON VAULT

CROSS REFERENCE TO RELATED APPLICATION

This application claims priority from the U.S. Provisional Patent Application Ser. No. 60/262,971 filed on Mar. 30, 2001.

FIELD OF THE INVENTION

This present invention relates to systematically store and access short-cut icons on electronic computing and communications devices, such as computers, personal digital assistants (PDAs), wireless phones, wired phones, and game consoles. A short-cut icon is used to conveniently access specific data or application directly from the specific icon displayed on the display screen of such devices, without having to search for that specific data or application through the directories of the storage devices connected to the device.

BACKGROUND OF THE INVENTION

Short-cut icons are individually created and arrayed according to the time order of creation on the display screen of electronic computing and communications devices, for conveniently accessing specific application programs, files, or data, without having to search for the program, file, or data from the directory structure of the connected storage device. By moving the "cursor" onto a specific icon representing the application, file, or data, and "clicking" the left button of the "mouse" input device, or by tapping an "electronic pen" on the icon, the specific application, file, or data is brought forth from connected storage device to the device screen for user access. The time-order of the creation of icons bears no relationship to the importance and frequency of use, therefore, appears to be rather random to the device user.

With the ever-increasing number of application programs, utilization of the devices, and the increasing number of files and data created, either automatically by the program installers, and/or by the user, the large number of short-cut icons clutter the larger device screens (see FIG. 1), confusing the user, and makes it difficult for the user to find a specific icon. The smaller display screens, such as on the wireless phones or PDAs, on the other hand, do not have enough space to display all of the icons for all of the applications, files, and data a user might desire to have convenient access to.

While a user can re-arrange the position of specific frequently used icons, one-by-one to preferred locations, such as the top row, or the first or last column, the creation of new icons would disturb such positioning. In addition, some applications, files, or data are frequently used at a certain time period, and at other time periods other applications, files, or data would become more frequently used. Therefore, the "re-positioning" of short-cut icons becomes laborious and inconvenient.

Deleting short-cut icons that are not frequently used from the display screen will make the "direct access" to these application, file, or data represented by the deleted icons no longer available, but would not delete the specific program, file, or data from the device. When situation changes, and a user needs to access these programs, files, or data, short-cut icons must be recreated for them. The process to create a short-cut icon for a program or file is not trivial, most users do not remember how to do it, and must relearn the process. Even if the user remembers how to do it, it is still a nuisance and a waste of time.

SUMMARY OF THE INVENTION

The present invention provides a virtual "filing cabinet"/"vault" for short-cut icons to reduce clutter and confusion on large electronic device screens, and enable organized storage of short-cut icons to be accessed at will for smaller device display screens. At the time of creation, and at any later time, every icon can be deposited into a vault with user defined directory structure. A data field allows device user or the program-installer to enter a brief notation of the nature, functionality, and the name of the program, file, or data represented by the short-cut icon. At the creation of a short-cut icon, choices can be presented to the user for whether the icon is to be displayed on the display screen, or stored in the "vault." If the user chooses to have the icon displayed on the display screen, the icon appears on the display screen, but can be deposited into the vault at any later time, at will. Otherwise, the shortcut icon remains in the filing cabinet, and can be called forth onto the display screen, at any later time, at will. The vault directory and notation for any short-cut icon can be created either at the time of the creation of the icon, or at any time after the short-cut icon is created and deposited on the display screen. The short-cut icon can be left on the screen, or moved off the screen and depositing into the vault, or recalled forth from the vault to be displayed on the display screen at any time, and back and forth as often as the user desires. In addition, multiple related icons can be collected into a single collective icon, with each icon accessible under the collective icon. The present invention also provides "icon deletion" and "program deletion" functions through a "pop-up" menu with each icon.

BRIEF DESCRIPTION OF THE DRAWINGS

FIG. 2 illustrates the present invention.
FIG. 3 illustrates the present invention.
FIG. 4 illustrates the present invention.
FIG. 5 illustrates the present invention.
FIG. 6 illustrates the present invention.
FIG. 7 illustrates the present invention.

DETAILED DESCRIPTION OF THE INVENTION

Figure 1:
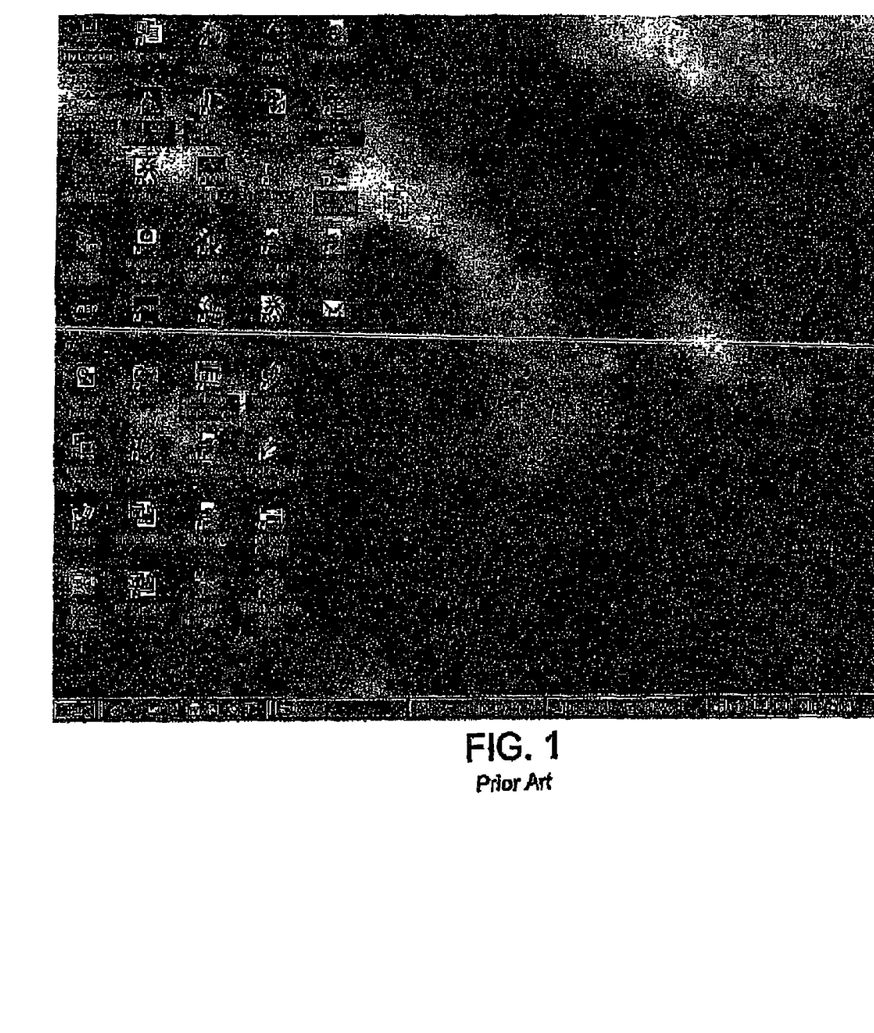
FIG. 1 illustrates a computer display screen displaying conventional short-cut icons.

Referring now to FIG. 1, showing the conventional short-cut icons 10 arrayed on a computer display screen. Each conventional short-cut icon allows the user to access a single application program, or a single data file by bringing the cursor to the icon, and "double-clicking" the left button of the "mouse" input device. Drag-and-Drop an icon to the "waste basket" icon 12, would delete the icon from the display screen. No other functions are provided with icon.

Figure 2:
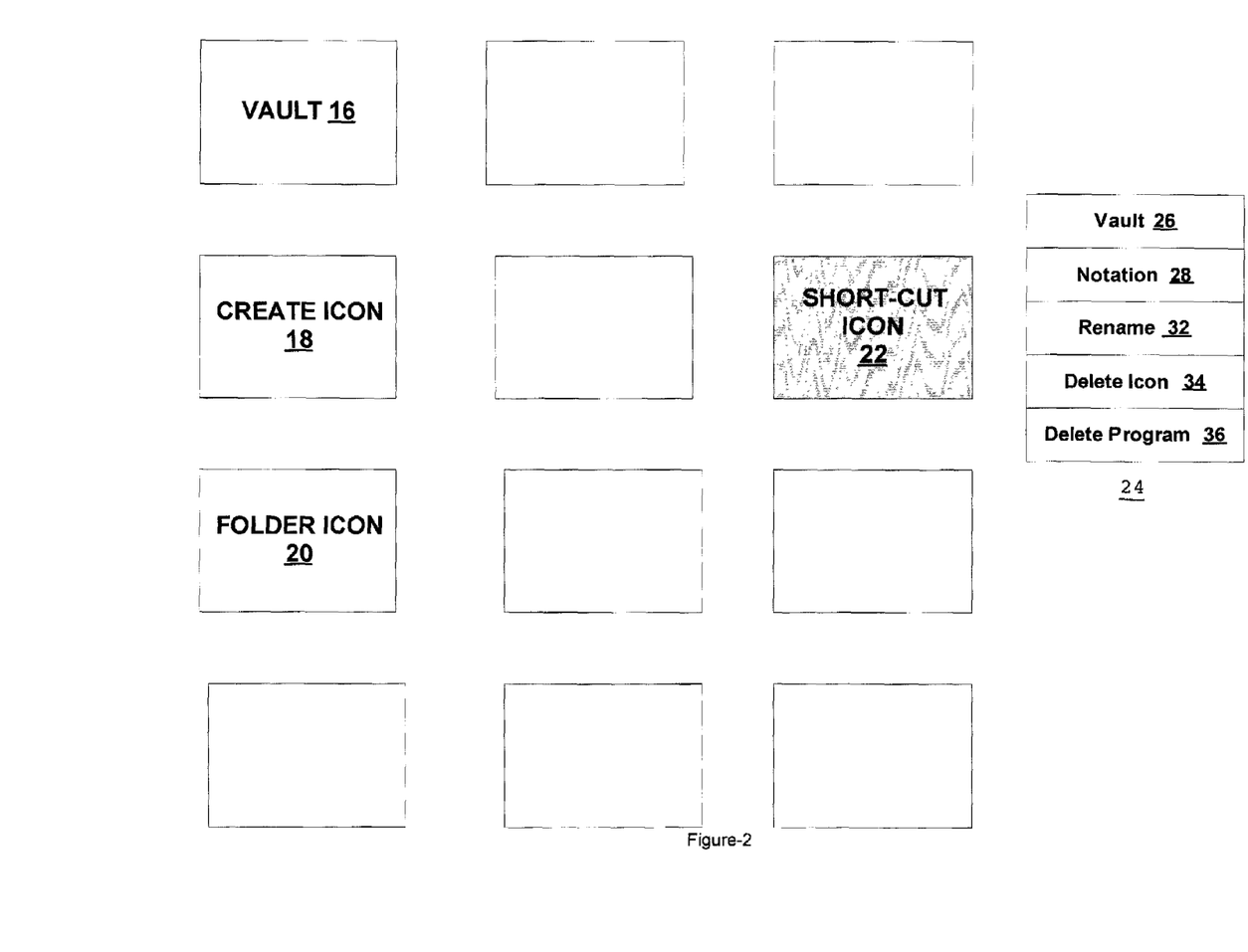

Referring now to FIG. 2, the present invention embeds a multitude of useful functions with the new short-cut icons: (1) store the icon(s) in a vault with directory structure for later access; (2) display, change, or make notation; (3) rename an icon; (4) delete icon; (5) delete program(s) associated with the icon. Icons presently stored in the icon-vault, and not displayed on the display screen can be access through the "Vault Icon 16." "Folder icons" can be created through "Create Icon 18." Multiple related icons can be drag-and-dropped into a folder-icon 20 created through accessing Create Icon 18. The icons shown in this and the following Figures are enlarged for the purpose of clarity.

When the cursor (or an electronic-pen) is moved onto any short-cut icon 22 on the display screen, a "pop-up" menu 24 appears offering choices of the functions stated in the above paragraph: (1) Vault 26; (2) Notation 28; (3) Rename 32; (4) Delete Icon 34; (5) Delete Program (or Data File, when the icon is a data-file icon) 36.

Figure 3:
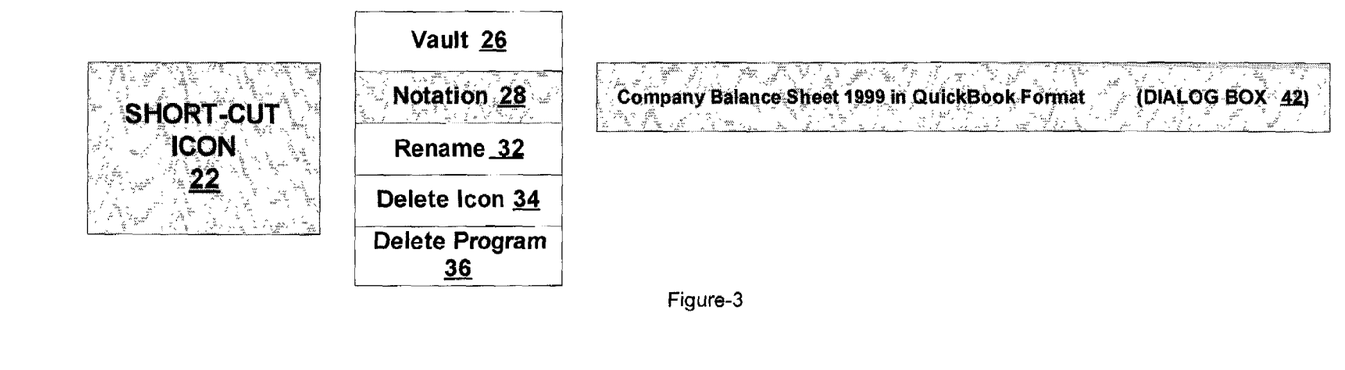

Referring now to FIG. 3 of the present invention, when the cursor is moved to "Notation 28" on the pop-up menu 16 in FIG. 2, a dialogue box 42 appears to display a brief description of the icon, if it is already entered. Editing the existing notation in the dialogue box 42 would modify the notation. If no notation exists, the dialog box is empty, and ready for the device user to input the desired notation.

Figure 4:
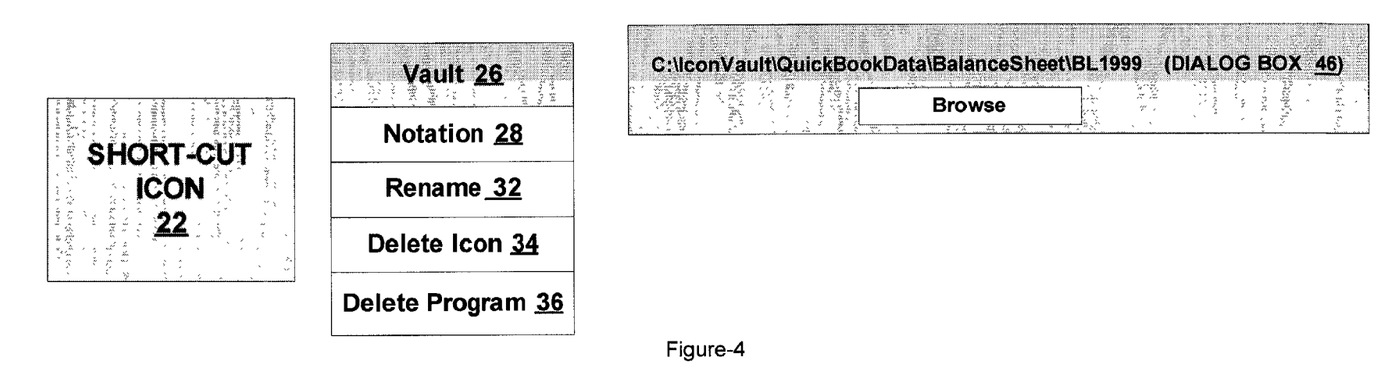

Referring now to FIG. 4 of the present invention, when the cursor is moved to "Vault 26," a dialogue box 46 appears to display where in the existing directory structure the specific icon would be stored, as shown in vault-directory. By leaving the cursor on "Vault 26," and either clicking the mouse input device, or tapping the pen input device, the icon is deposited into the specific vault location as indicated in the dialogue box 46. The user can change the vault location for the icon by moving the cursor into the dialogue box 46, and editing the present location, or selecting a new location. If a vault location has not yet been specified for the icon, a mechanism to specify the vault location is provided via the dialog box 46, where the directory up to "C:\IconVault\" would be shown, and the user can either browse the existing directories/folders under the IconVault directory and select the proper location, or enter the desired location path name, or create a new folder directly underneath IconVault, or underneath any other directory path under the IconVault.

Figure 5:
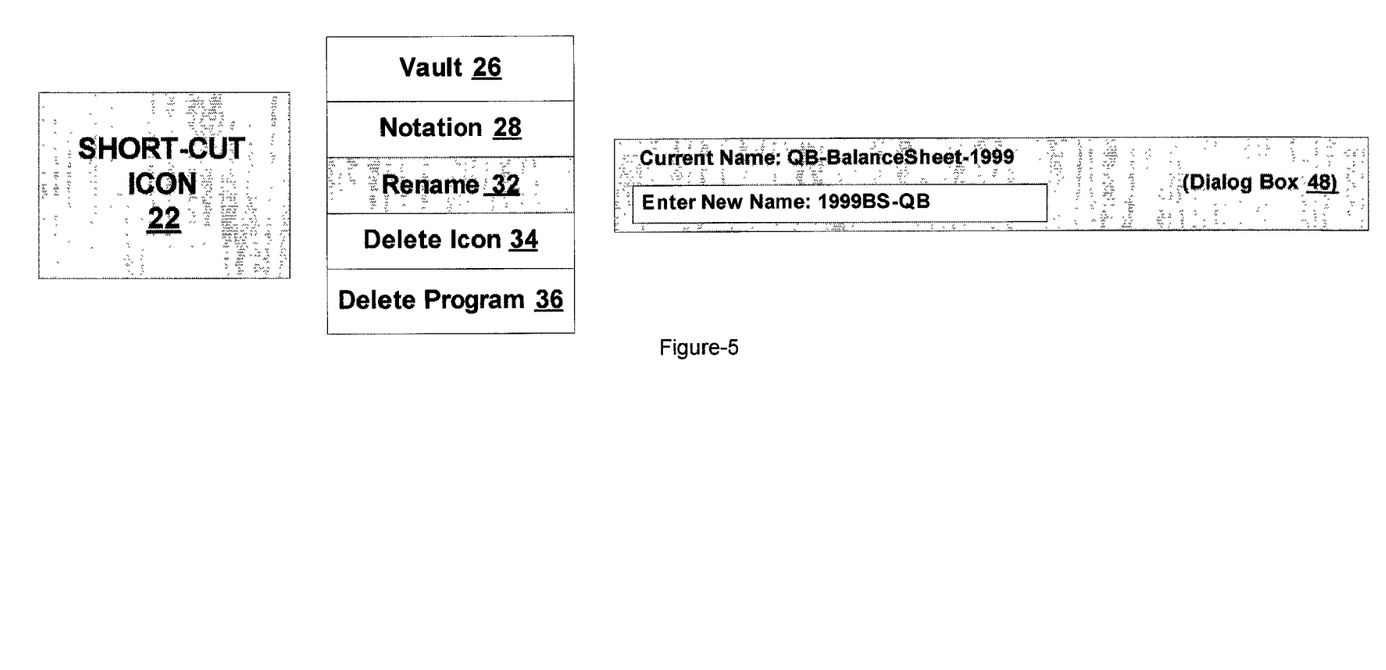

Referring now to FIG. 5 of the present invention, if the user moves the cursor Rename 32, a dialogue box 48 appears to display the current full name of the icon, and for the user to enter a new name for the icon. Moving the cursor onto Delete Icon 34, and "click the mouse input device or tap the pen input device would delete the icon from the display screen without storing it the vault, nor deleting the program or data file the icon represent. Moving the cursor onto Delete Program (or Data File) 36, and clicking/tapping the input device, would in one swoop delete the program or the data file the icon represents.

Figure 6:
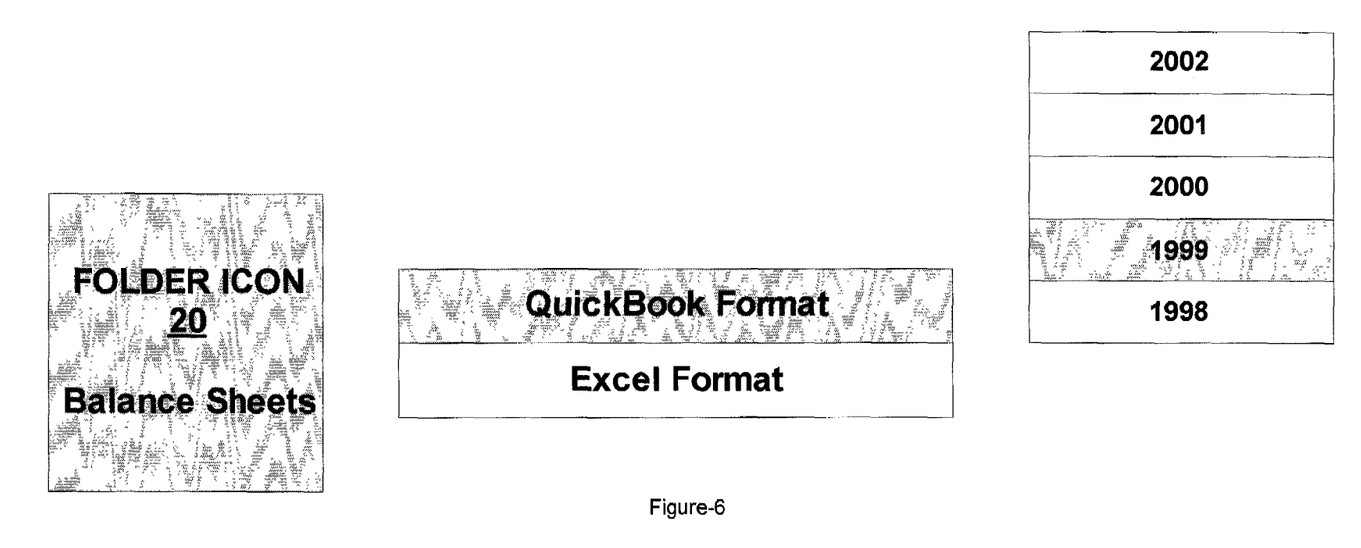

Referring now to FIG. 6 of the present invention, if a short-cut icon is a collective folder-icon 62 that collects a number of related short-cut icons, all short-cut icons collected under it would appear up in the first-level pop-up menu 64, when the cursor (or an electronic pen) is moved onto the folder-icon. When the user moves the cursor onto a specific short-cut icon in the menu, the function-selection pop-up menu as described from FIG. 2 through FIG. 4 appears.

Figure 7:
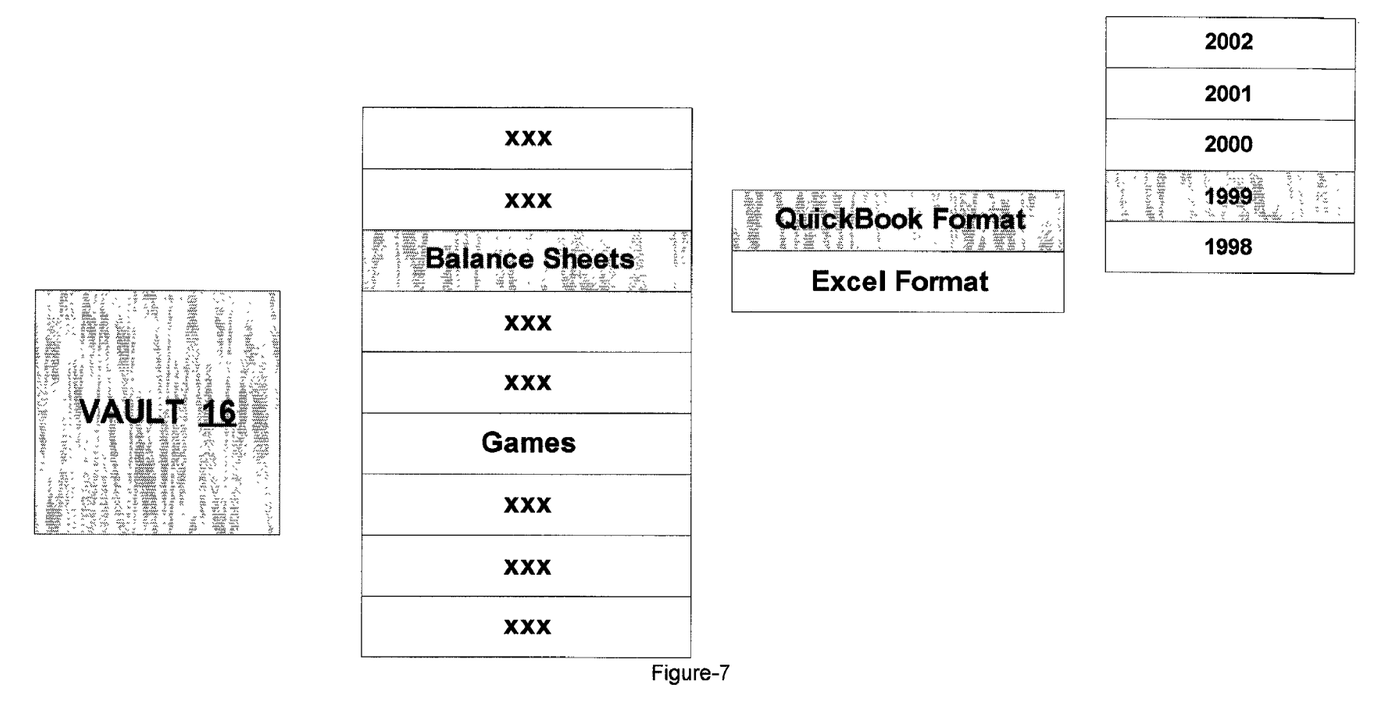

Referring now to FIG. 7 of the present invention, the user can pull-forth the short-cut icon stored in the Icon-Vault, by moving the cursor to the "Vault Icon 16" shown in FIG. 2. The vault directory would appear next to the Vault Icon 16 as shown in FIG. 7. As an example, when the short-cut icon for "Company Balance Sheet 1999 in QuickBook Format" is stored in the Vault, by moving the cursor progressively through the directory path as shown highlighted in FIG. 7, and then double-clicking or tapping the input device, the short-cut icon for that data file would appear on the display screen again, ready for access.

If the user wishes to access the program or file represented by a short-cut icon, he/she merely ignores the pop-up menu 24 in FIG. 2, and clicks or taps on the icon as is conventionally done.

If the user chooses to "clean up" the icon from the display screen (also called the "desktop" for desktop computers), the user would move the cursor onto the Vault 26 selection in the pop-up menu 24 in FIG. 2. Or the user can create new folder-icons, and drag-and-drop related short-cut icons into a folder icon, as described in FIG. 2.

The "desktop" (or display screen) now can keep only those data files and programs currently frequently accessed, without the clutter and confusion. The short-cut icons are stored in sensible directory structure in the virtual filing-cabinet, and can be called forth onto the "desktop/display-screen" when needed, either in groups, or individually, at and for any time period.

In addition, with the method of the present invention, the arraying of the icons can be ordered, in groups and/or individually according to the user's priority and preference.

The invention provides efficient and convenient ways to access programs and files. It also allows the user organize, show, and hide the short-cut icons on the device display screen, avoiding clutter and confusing, and saving time and hassle for looking for a specific short-cut icon from the clutter, or having to frequently delete and recreate a number of short-cut icons.

Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A system for organizing short-cut icons displayed on an electronic display device, comprising:
   a virtual filing cabinet for storing a plurality of short-cut icons displayed on an electronic display device to reduce clutter on the display device, wherein when the icons are stored they are not visible on the display device, the icons able to be selectively retrieved from the cabinet so that they are then displayed on the display device; and
   a pop-up menu associated with each short-cut icon, said pop-up menu providing a first menu entry for renaming the associated short-cut icon and a second menu entry to display, enter or change a notation regarding a brief description of the associated short-cut icon wherein moving a cursor on the second menu entry displays a dialog box with said notation provided the notation has been entered.

2. The system according to claim 1, wherein each one of the plurality of icons can be stored in the virtual filing cabinet using a user-defined directory structure, the directory structure able to be selectively changed by the user.

3. The system according to claim 2, wherein the user-defined directory structure is selected when an icon is created or at any time thereafter.

4. The system according to claim 1, wherein the user is prompted to decide whether an icon is to be stored in the cabinet or displayed on die display device when the icon is created.

5. The system according to claim 1, wherein a displayed icon can be selectively stored in the virtual filing cabinet at any time.

6. The system according to claim 1, wherein a stored icon can be selectively called forth from the cabinet and displayed on the display device at any time.

7. The system according to claim 1, wherein the notation is created when an icon is created or at any time thereafter.

8. The system according to claim 1, wherein the virtual filing cabinet is represented on the display device by an icon which when selected by a user brings forth a directory of the plurality of stored icons from which the user can selected a desired icon.

9. The system according to claim 1, further including a collective icon representing a plurality of related icons, wherein selecting the collective icon brings forth from the cabinet and displays on the display device all of the plurality of related icons.

10. The system according to claim 1, wherein when an input device is placed over a respective one short-cut icon displayed on the display device, the pop-up menu associated therewith is displayed on the display device.

11. The system according to claim 10, wherein the user can use the pop-up menu to store the associated short-cut icon in the cabinet for access at a later time.

12. The system according to claim 10, wherein the pop-up menu includes a third menu entry to delete the associated short-cut icon from the display device without storing it to the virtual filing cabinet and without deleting a program or data file represented by the short-cut icon.

13. The system according to claim 10, wherein the pop-up menu includes a third menu entry to delete a program or data file represented by the associated short-cut icon.

14. A method for organizing short-cut icons displayed on an electronic display device, comprising the step of:

utilizing a virtual filing cabinet for storing a plurality of short-cut icons displayed on an electronic display device to reduce clutter on the display device, wherein when the icons are stored they are not visible on the display device, the icons able to be selectively accessed from the cabinet so that they are then displayed on the display device;

displaying a pop-up menu associated with each short-cut icon, said pop-up menu providing a first menu entry for renaming the associated short-cut icon and a second menu entry to display, enter or change a notation regarding a brief description of the associated short-cut icon; and displaying, when moving a cursor on the second menu entry, a dialog box with said notation provided the notation has been entered.

15. The method according to claim 14, wherein the virtual filing cabinet is represented on the display device by an icon which when selected by a user brings forth a directory of the plurality of stored icons from which the user can selected a desired icon.

16. The method according to claim 14, further comprising the stop of entering a notation regarding the nature, functionality and name of a program, file or data represented by the icon in the dialog box.

17. The method according to claim 14, further comprising the step of utilizing a collective icon representing a plurality of related icons, wherein selecting the collective icon brings forth from the cabinet and displays on the display device all of the plurality of related icons.

* * * * *